UNITED STATES PATENT OFFICE.

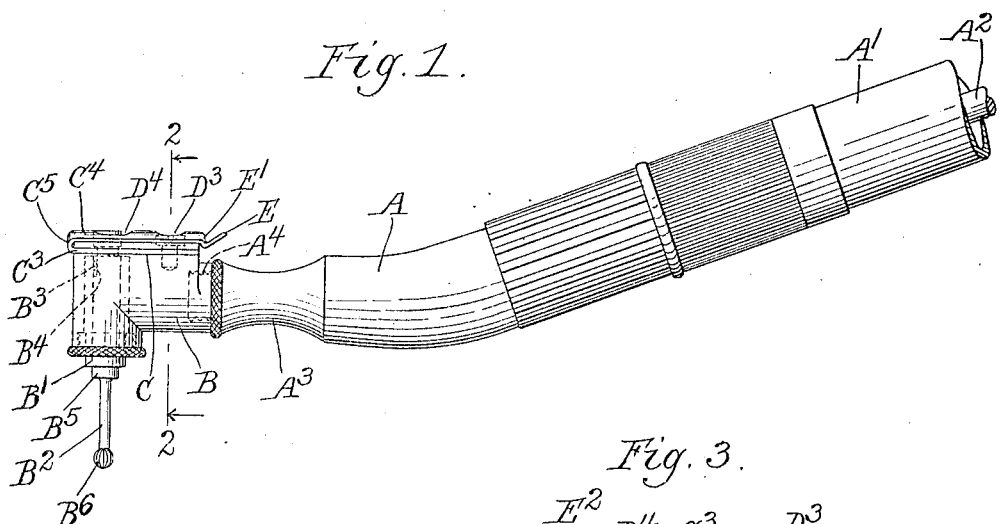

PETER J. L. NEMMERS, OF CHICAGO, ILLINOIS.

BUR-HOLDER FOR DENTAL TOOLS.

1,292,632.     Specification of Letters Patent.     Patented Jan. 28, 1919.

Application filed October 8, 1917. Serial No. 195,435.

*To all whom it may concern:*

Be it known that I, PETER J. L. NEMMERS, a citizen of the United States, residing at Chicago, in the county of Cook and State of Illinois, have invented a certain new and useful Improvement in Bur-Holders for Dental Tools, of which the following is a specification.

My invention relates to improvements in bur holders for dental tools and has for one object to provide an attachment which holds the shank or other cutting or drilling tool in the head of the hand piece in operative relation to the driving mechanism. Another object is to provide such a device which may be manipulated with ease with one finger without any great display of force and without displacing any of the associated parts. Other objects of my invention will appear from time to time in the specification.

My invention is illustrated more or less diagrammatically in the accompanying drawing, wherein—

Figure 1 is a side elevation;

Fig. 2 is a section on an enlarged scale along the line 2—2 of Fig. 1;

Fig. 3 is a plan view of the device;

Fig. 4 is an inverted plan view; and

Fig. 5 is a side elevation of a bur in a greatly enlarged scale.

Like parts are indicated by like characters in all the figures.

A is the ordinary type of dentist tool hand piece attached to the end of a hollow flexible tube $A^1$ in which is mounted a shaft $A^2$ rotated by any suitable source of power not here shown. This hand piece is reduced as at $A^3$ and terminates in a screw threaded shank $A^4$.

B is a driving chuck shaped as shown. Into it is screw threaded the shank $A^4$ and it contains rotatably mounted therein a driving sleeve $B^1$ driven by any suitable transmission mechanism not here shown from the shaft $A^2$. This driving sleeve $B^1$ is cylindrical and adapted to contain the bur $B^2$. The inside of this sleeve has a projection $B^3$ adapted to engage the notch $B^4$ in the surface of the shank of the bur whereby when the bur is positioned to be driven it will rotate with the sleeve. The bur itself has a cylindrical shank $B^5$ in which the notch $B^4$ is located and terminates in a cutting tool $B^6$ and has an annular slot thereabout adjacent its butt end.

The member B is slotted as at C. This slot extends almost entirely through the head but is joined to it by a relatively thin part $C^1$. The locking member $C^2$ is made, as indicated, of two thin sheet parts $C^3$, $C^4$ arranged one above another and joined at their ends by the curved member $C^5$. The part $C^3$ is flat and engages and is located within the slot C. The part $C^4$ is curved as shown and is adapted to closely and snugly engage the upper surface of the member B.

The catch member $C^2$ is held in position in the slot C by means of a screw D passing through both parts of the head B and holding them together. This screw also passes through the slot $D^1$ in the flat member $C^3$ so that when the parts are in position that member is free to move back and forth being limited only by the engagement of the slot and the screw. The member $C^3$ is also perforated as at $D^2$ in line with the sleeve $B^1$. The perforation is irregular as shown and made up of two parts, the larger one big enough to pass over the end of the bur shank, the smaller one so small that the end of the bur shank cannot pass through it, but large enough so that it fits into the reduced annular groove in the bur shank so that when the part is moved to the left as shown in Figs. 1 and 3 the bur may be put in place, when the latch is moved to the right the reduced part of the slot will engage the groove in the shank of the bur and hold it against longitudinal displacement. $D^3$ is a perforation in the upper part of the latch $C^4$ so that the screw D may be put in place. It has no other function. The screw D is screwed down so that it is flush with the head B and member $C^2$ may slide back and forth over it. $D^4$ is a slot in the part $C^4$ in line with the sleeve $B^1$ so arranged that even though the end of the shank of the bur may project slightly it will not come in contact with the part $C^4$ and the latch will be free to move back and forth at the will of the operator.

In order that the latch may be easily manipulated, the part $C^4$ terminates in an upwardly bent thumb piece E. This piece is so arranged so that the hand of the operator merely pressing against it with the finger will result in springing the latch $E^1$ between the thumb piece and the member $C^2$ and slipping the locking member to the left, but this latch having substantially right angle engagement will normally hold the parts in the position shown in Fig. 1. The screw D limits the movement of the lock and E² is a finger engaging one side of the head B and of such length that when the lock is in its farthest left hand position the finger still engages the head B and makes it impossible for the lock to rotate thus constraining it to a longitudinal movement.

It will be evident that while I have shown in my drawings an operative device, still many changes might be made both in size, shape and arrangement of parts without departing materially from the spirit of my invention and I wish, therefore, that my drawings be regarded as in a sense diagrammatic.

I claim:—

1. The combination with a hand piece for a dental drill, of a tool, a tool holder comprising a U-shaped spring having an upper and a lower portion substantially equal in length, the bend of the U which joins them being adapted to contact the outer end of the hand piece, one of them perforated to engage the tool and hold it against longitudinal movement said perforation being shaped to release the tool when in one position and adapted to engage a groove in the tool whereby it holds it against longitudinal movement.

2. The combination with a hand piece for dental drills, of a tool, a tool holder comprising a U-shaped spring having an upper and a lower portion substantially equal in length, the bend of the U which joins them being adapted to contact the outer end of the hand piece, the long axes of said portions being parallel with the axis of the hand piece one of them perforated to engage the tool and hold it against longitudinal movement.

3. The combination with a hand piece for dental drills, of a tool, a tool holder comprising a U-shaped spring having an upper and a lower portion substantially equal in length, the bend of the U which joins them being adapted to contact the outer end of the hand piece, the axis of said portions being parallel with the axis of the hand piece.

4. The combination with a hand piece for dental drills, of a tool, a tool holder comprising a U-shaped spring having an upper and a lower portion substantially equal in length, the bend of the U which joins them being adapted to contact the outer end of the hand piece, one of them perforated to engage the tool and hold it against longitudinal movement, the end of the upper blade of the spring being bent to form a latch.

5. The combination with a hand piece for dental drills, of a tool, a tool holder comprising a U-shaped spring having an upper and a lower portion substantially equal in length, their axes parallel with the axis of the hand piece, one of them perforated to engage the tool and hold it against longitudinal movement, the upper blade of the spring being bent to form a latch, with a thumb piece projecting therefrom.

6. The combination with a hand piece for dental drills, of a tool, a tool holder comprising a U-shaped spring having an upper and a lower portion substantially equal in length, their axes parallel with the axis of the hand piece, one of them perforated to engage the tool and hold it against longitudinal movement the upper blade of the spring bent to form a latch, with a thumb-piece projecting therefrom, said latch and thumb-piece being disposed substantially across the axis of the hand piece.

7. The combination with a hand piece for dental drills, of a tool, a tool holder comprising a U-shaped spring having an upper and a lower portion substantially equal in length, their axes parallel with the axes of the hand piece, one of them perforated to engage the tool and hold it against longitudinal movement the upper blade of the spring bent to form a latch, with a thumb-piece projecting therefrom, said latch and thumb-piece being disposed substantially across the axis of the hand piece, said latch adapted yieldingly to engage one edge of the hand piece.

8. The combination with a hand piece for dental drills, of a tool, a tool holder comprising a U-shaped spring having an upper and a lower portion substantially equal in length, their axes parallel with the axis of the hand piece, one of them perforated to engage the tool and hold it against longitudinal movement the spring adapted for longitudinal movement along the hand piece and means for holding the latch member against rotary movement independent of the longitudinal movement, said means comprising a finger engaging one side of the hand piece.

9. The combination with a hand piece for dental drills, of a tool, a tool holder comprising a U-shaped spring having an upper and a lower portion substantially equal in length, their axes parallel with the axis of the hand piece, one of them perforated to engage the tool and hold it against longitudinal movement, the spring adapted for longitudinal movement along the hand piece and means for holding the latch member against rotary movement independent of the longitudinal movement said means comprising a finger engaging one side of the hand piece said finger extending from the bend of the spring.

10. The combination with a hand piece for dental drills, of a tool, a tool holder comprising a U-shaped spring having an upper and a lower portion, the bend of the U which joins them being adapted to contact the outer end of the hand piece, the lower portion apertured, a screw passing through the aperture, the upper portion apertured above the screw, the latter aperture having a diameter larger than the screw head.

11. The combination with a hand piece for dental drills, of a tool, a tool holder comprising a U-shaped spring having an upper and a lower portion, the bend of the U which joins them being adapted to contact the outer end of the hand piece, the lower portion apertured to engage a groove in the tool, the upper portion apertured above the end of the tool.

12. The combination of a hand piece for dental drills, of a tool, a tool holder having a U-shaped spring having an upper and a lower portion, the bend of the U which joins them being adapted to contact the outer end of the hand piece, the lower portion having a plurality of apertures, a screw passing through one of the apertures, another aperture engaging a groove in the tool, the upper portion apertured above the screw and above the end of the tool, the aperture above the screw being of the diameter larger than the screw head.

13. The combination with a hand piece for dental drills, of a tool, a tool holder comprising a U-shaped spring the axis of the spring arms being parallel with the axis of the hand piece, means for holding the U bend of the spring firmly against the end of the hand piece, said means comprising a latch on one arm of the spring operating against the end of the hand piece opposite the U bend.

14. The combination with a slotted hand piece for dental tools, of a tool holding latch comprising a perforated member adapted to slide within the hand piece, one of the perforations therein being of irregular shape and adapted when the member is in one position to hold the tool and when in another position to permit withdrawal, a locking spring comprising a part integral with the sliding strip bent first upwardly and then rearwardly above the strip adapted to slide on the outside of the hand piece, said latch portion being perforated in register with the perforations in the slidable part contained within the slot, the end of such latch portion being bent downwardly to lock on the hand piece and then upwardly to provide a thumb piece whereby the latch may be disengaged, an integral tongue bent rearwardly from the upwardly bent portion and adapted to engage one side of the hand piece and a holding screw adapted to limit the longitudinal movement of the hand piece.

In testimony whereof, I affix my signature in the presence of two witnesses this 28th day of September, 1917.

PETER J. L. NEMMERS.

Witnesses:
MINNIE M. LINDENAU,
MARION L. INGRAHAM.

Copies of this patent may be obtained for five cents each, by addressing the "Commissioner of Patents, Washington, D. C."